United States Patent [19]

Stobb

[11] 4,419,035
[45] Dec. 6, 1983

[54] METHOD AND APPARATUS FOR MOVING BUNDLES OF SHEETS

[75] Inventor: Walter J. Stobb, Pittstown, N.J.

[73] Assignee: Stobb, Inc., Clinton, N.J.

[21] Appl. No.: 370,372

[22] Filed: Apr. 21, 1982

[51] Int. Cl.³ .......................................... B65G 57/24
[52] U.S. Cl. ..................................... 414/71; 414/101; 414/110; 414/786
[58] Field of Search ................. 414/52, 70, 71, 101, 414/110, 786, 57

[56] References Cited

U.S. PATENT DOCUMENTS

| | | | |
|---|---|---|---|
| 2,933,313 | 4/1960 | Stobb | 271/68 |
| 3,612,300 | 10/1971 | Berghgracht | 414/101 X |
| 3,739,924 | 6/1973 | Stobb | |
| 3,757,966 | 9/1973 | Cox et al. | 414/71 X |
| 3,820,446 | 6/1974 | Granbom et al. | 92/88 |
| 3,826,487 | 7/1974 | Förster | 271/263 |
| 3,901,392 | 8/1975 | Streckert | 414/71 |
| 4,082,174 | 4/1978 | Stobb | 198/368 |
| 4,083,461 | 4/1978 | Wangermann | 414/71 |

FOREIGN PATENT DOCUMENTS

| | | | |
|---|---|---|---|
| 18354 | 11/1957 | Fed. Rep. of Germany. | |
| 2213120 | 9/1973 | Fed. Rep. of Germany | 414/71 |
| 2721675 | 11/1978 | Fed. Rep. of Germany | 414/70 |

Primary Examiner—Leslie J. Paperner
Attorney, Agent, or Firm—Arthur J. Hansmann

[57] ABSTRACT

Method and apparatus for stacking bundles of sheets from a pick-up station and onto a pallet and with an overhead crane system. The bundle is produced by a stacker where the crane system picks up the bundle and moves the bundle overhead and deposits the bundle onto a pallet where a collection of bundles is assembled. An electric system is employed for energizing a pick-up clamp and lifting it overhead, and electric elements are utilized for displacing the clamp to the location of the pallet for the deposit of the bundle onto the pallet. Also, a pallet or skid hopper and supply apparatus are employed for continuously presenting the pallet to a location where the bundles are placed onto the pallet, and the loaded pallet is then automatically removed from that location. The method and apparatus of this invention also comprises moving bundles of sheets from a pickup station and to remote locations, such as sheet feeders.

10 Claims, 4 Drawing Figures

METHOD AND APPARATUS FOR MOVING BUNDLES OF SHEETS

This invention relates to a method and apparatus for moving bundles of sheets, such as sheets or signatures which are used in the graphic arts industry. The bundles are stacked by moving them from a sheet stacker location and onto a pallet where they are in side-by-side relationship with each other; and they may also be moved from a stack and to a sheet feeder.

BACKGROUND OF THE INVENTION

The graphic arts industry is faced with the problem of transferring bundles of printed sheets or signatures from one location to another. It is known practice to stack sheets from a stream of sheets and into a stack, such as shown in U.S. Pat. No. 2,933,313. The stack of sheets can then be bound into a bundle. At that point, it is of concern to move the bound stack of sheets to the sheet feeder so that the sheets can then be fed to a collector or gatherer. The present invention provides a method and apparatus for efficiently and accurately moving the bound bundles to a pallet whereupon the collection of bundles, via the pallet, can then be moved to the feeder. Also, the bundles can be moved from the collection and to the feeder. That is, this invention eliminates the heretofore bottleneck whereby the bound bundles were previously laboriously moved or collected at the stacker output, and the continuous flow of the bundles was thus interupted and created a problem.

The present invention provides a method and apparatus of continuously moving the bound bundles from a pick-up station and to a remote location, and it does so in an automatic arrangement whereby no manual lifting or guidance is required. In accomplishing these advantages, this invention can utilize the fluid cylinder assemblies such as those shown in U.S. Pat. No. 3,820,446. One phase is clamping and palletizing of bundles, and the overhead lifting and transporting of the bundles from the stacker and to the pallet. Also, German Democratic Republic Patent #18354 shows a cable type of lift for bundles, but, the present invention differs from that disclosure in the respect that the present invention handles bound bundles and moves them continuously from a stacker and locates them into a collection or stacked arrangement on a pallet where the bundles are disposed side-by-side and each bundle is free standing or self contained and need not require a special carrier or basket, and the method and apparatus of this invention is fully automated to where there is a continuous movement of the bundles from the stacker and to the pallet until the pallet is filled with the desired number of bundles.

Other objects and advantages have become apparent upon reading the following description in light of the accompanying drawings.

DETAILED DESCRIPTION OF THE PREFERRED METHOD AND APPARATUS

Figure 1:
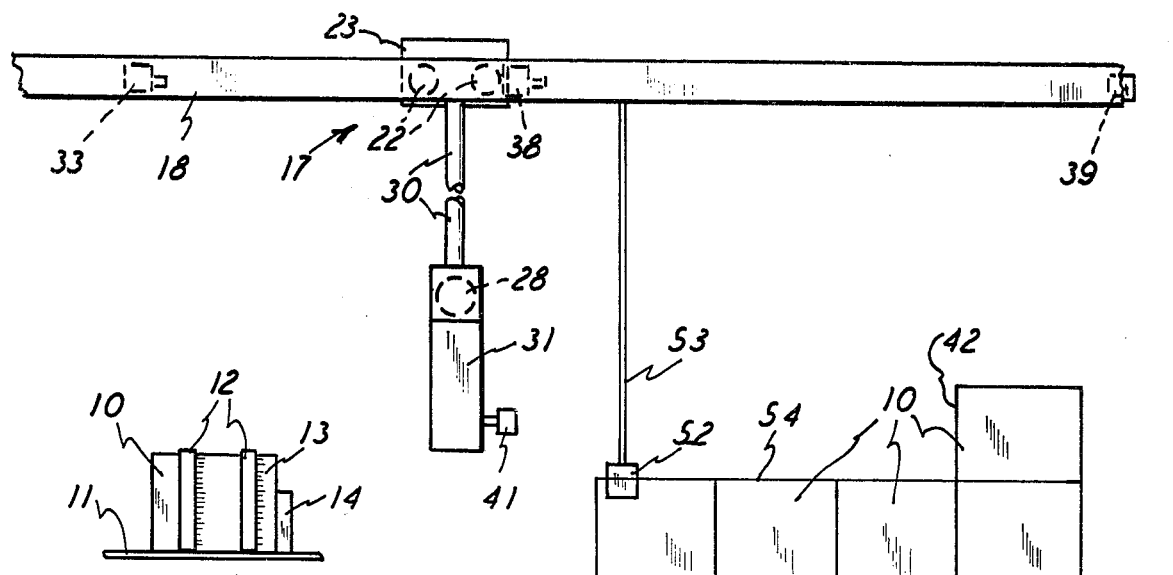
FIG. 1 is a side elevational view of a showing of some of the apparatus of this invention.

A bundle of sheets or signatures 10 is shown on a conventional support or conveyor 11 and is bound by conventional straps 12 and has the usual end boards 13. A guide 14 locates the bundle 10 on its support or conveyor 11. It will be readily understood by one skilled in the art that the bundle 10 has been assembled, in the conventional and well known manner, by a conventional stacker (unshown) and the bundle 10 has been conveyed to its stationary location shown in FIG. 1. That is, the stacker shown in U.S. Pat. No. 2,933,313, for instance, could form the bundle 10, and conventional strapping or binding apparatus (now shown) is employed for binding the bundle 10 as shown into the elongated shape with the ends at the boards 13.

Figure 3:
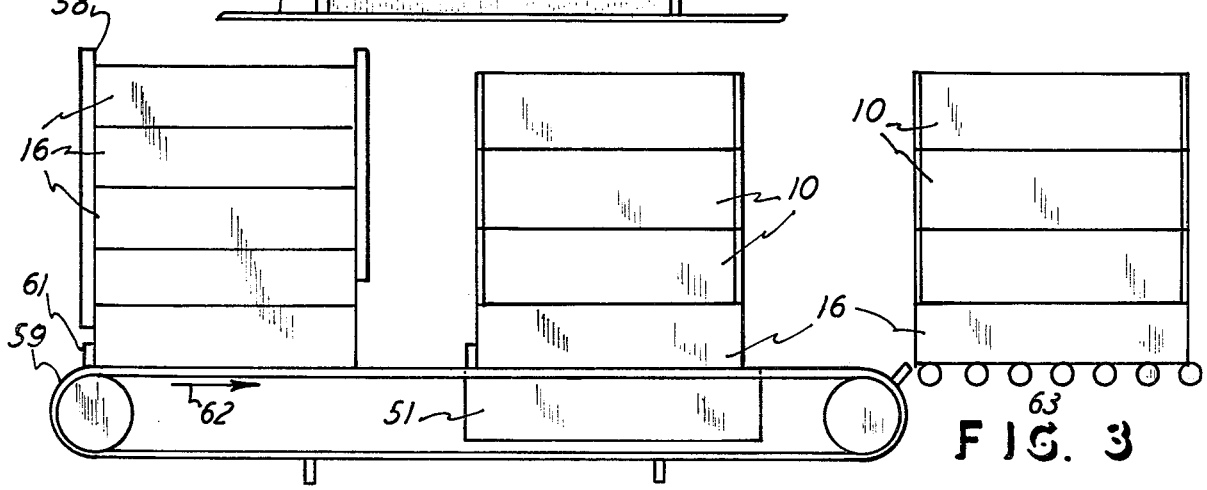
FIG. 3 is an end elevational view of the pallet hopper and loaded pallets, as shown in FIG. 1, but on a reduced scale.

The stacker will continuously produce and present bundles 10, and, in accordance with the present invention, the individual bundles 10 will be stacked on a skid or pallet 16, as shown in FIGS. 1 and 3. Thus, with the present invention, there is automated or continuous movement of bundles 10 from a conveyor or support 11 to the pallet 16, in the side-by-side arrangement of the bundles 10 on the pallet 16. Ultimately, the pallet 16 would be transported with its bundles 10 to the desired location of a feeder of conventional design and not shown herein.

Figure 2:
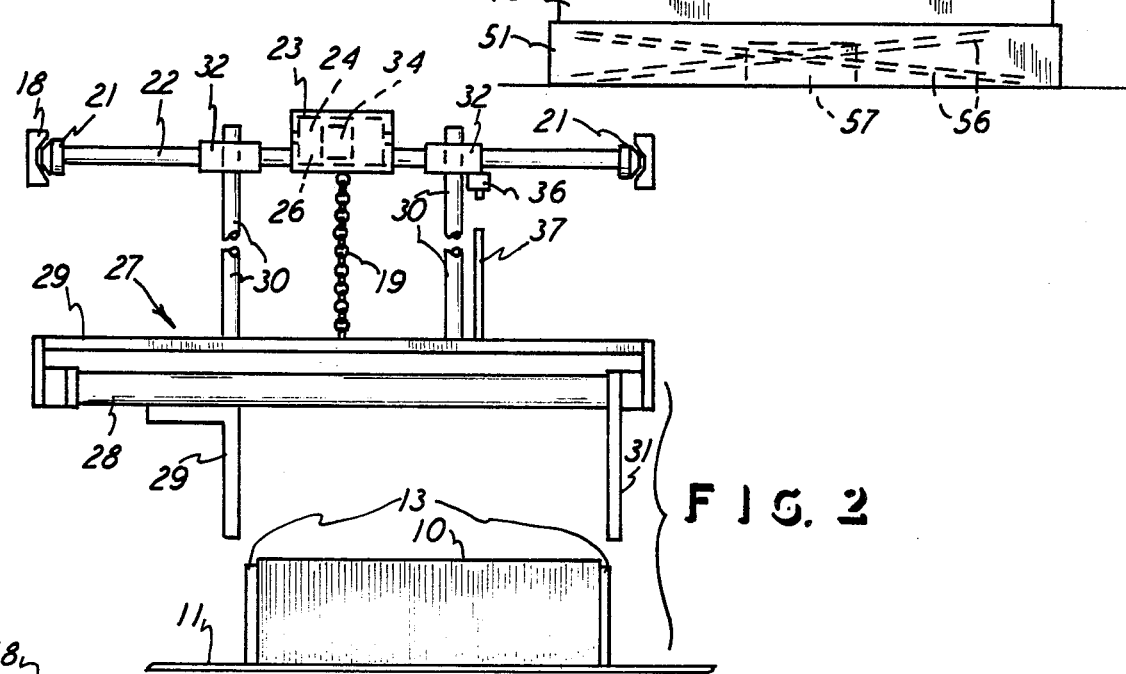
FIG. 2 is an end elevational view of the apparatus shown in FIG. 1.

An overhead crane assembly generally designated 17 is shown to include two spaced-apart overhead tracks 18 and a lifting chain 19 shown in FIG. 2. The assembly 17 includes rollers or wheels 21 shown on two shafts 22 which extend from a housing 23. A conventional electric motor designated 24 is incorporated in the housing 23 and is suitably connected with the shafts 22 to rotate the shafts and thus move the shafts and the housing 23 on the chain 19 along the two spaced apart tracks 18. The motor 24 is preferably electric, and it drives a chain reel designated 26 and on which the chain 29 is wrapped for extension and contraction and thus raising and lowering a clamp assembly 27. The assembly 27 is shown to include a conventional fluid cylinder assembly 28 which has two spaced apart abutments 29 and 31, and these abutments flank and abut the ends of the bundle 10, longitudinally thereof, and thus can clamp onto the bundle 10 for raising the bundle off its support 11, as indicated in FIG. 2. The clamp 27 is U-shaped and is clear of the bundle bottom and two opposite sides, such as the side facing in FIG. 2 and extending between the end boards 13.

The assembly 27 includes a bracket 29 to which the fluid assembly 28 is attached, and two upright rods 30 have their lower ends connected to the bracket 29 and have their upper ends slidable in guide blocks 32 which are suitably mounted with the two shafts 22, as shown.

Thus, upon operation of the electric motor within the housing 23, the reel within the housing 23 will rotate and extend or retract the chain 19 and thereby lower or raise the clamp assembly 27.

In operation, a conventional electric motor within the housing 23 is suitably drivingly related to the shafts 22 for displacing the crane assembly 17 along its track 18 and to initially position the clamp assembly 27 directly above the first bundle 10, that would be moving the assembly 17 to the left from its shown position in FIG. 1. Next, the electric motor for driving the reel 26 would be energized, such as by having the housing 23 abut an electric switch 33 on the track 18 and in the path of the housing 23. The switch 33 would therefore energize the electric motor for lowering the chain 19 and thus lowering the assembly 27 and thereby position the abutments 29 and 31 at opposite ends of the bundle 10. Next, an electric switch 34 conventionally connected and related to the reel 26 and chain 19 would be actuated, such as by detecting slack in the chain 19 when the clamp assembly 27 settles down on to the bundle 10. Also, the switch 34 would then actuate the fluid assembly 28 to have its abutments 29 and 31 close on the bundle 10 and thus clamp the bundle. Next, after a suitable time delay for the clamping action, an electric switch 36 which is suitably electrically connected in the entire electric system being described, would be actuated to cause the reel 26 to retract the chain 19 and thereby lift the clamp assembly 27 and the clamped bundle 10, and the lifting continues until a switch tripper 37 abuts the switch 36 and thus places the switch 36 in a different switch position. Next, having tripped switch 36, an electric switch 38 on the housing 23 is positioned so that it operates the conventional electric motor for displacing the crane assembly 17 along its track 18, and, this time, the assembly 17 is moved to the right, as viewed in FIG. 1, until the clamped bundle 10 is in a suitable position over the pallet 16. That position is initially determined by a switch tripper 39 fixed on the track 18 to engage and trip the switch 38 and thus stop the displacement motor mentioned. At that time, the switch 38 is also suitably electrically connected with a conventional electric control for the cylinder assembly 28 to thereby release the abutments 29 and 31 from the bundle 10 and deposit the bundle 10 on the pallet 16.

At this time it will be mentioned that a photo-electric cell 41, of a conventional design, is positioned on the clamp assembly 27 as shown in FIG. 1 and is available for detecting the location of the bundle 10 in the right hand column, as viewed in FIG. 1, such as the single bundle 10 on the upper layer shown in FIG. 1. That is, the photo-cell 41 detects the bundle edge designated 42, and, with suitable and conventional electric connections, the electric element 41 controls the motor displacing the crane assembly 17 so that the assembly 17 stops in the appropriate position adjacent the bundle on the right hand of the stack of FIG. 1. It will also be seen and understood that the rods 30, along with the two shafts 22, create a stability for the clamp 27 and the retained bundle 10 so that there is no swinging of the clamp 27 and thus accurate positioning can be achieved for both pick-up and deposit.

Figure 4:
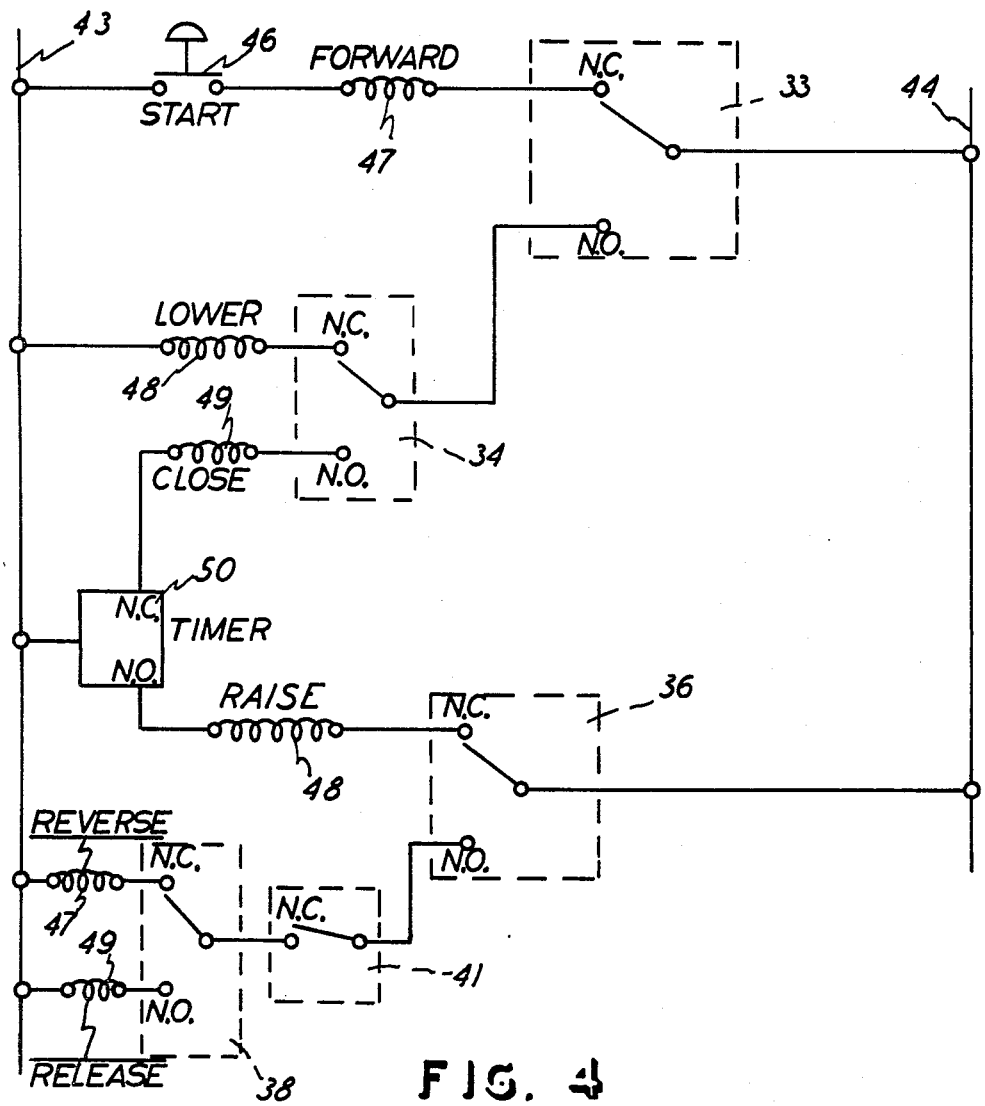
FIG. 4 is a schematic electric element showing.

To reiterate the aforementioned description with respect to the electrical system described, FIG. 4 shows an electric schematic where the various electric elements are shown and connected across the electric lines designated 43 and 44. In that schematic, a manually operative start electric switch 46 as shown, and the switch 33 is shown to connect to the forward drive of the motor now designated 47, and that connection is through the contact indicated "normally closed". As mentioned, when switch 33 is first tripped, it then moves to the position indicated "normally open" and that connects switch 34 and motor now designated 48 into the system. When switch 34 is switched, it connects the motor now designated 49 into the system, and there is also shown a conventional timer designated 50 and that timer holds the electric connections mentioned until the clamp 27 can close onto the bundle 10. Next, the switch 36 is then in a connected position and it again energizes the motor designated 48, but in the reverse direction from that previously mentioned, for raising the bundle 10, and the switch 36 is eventually tripped and then the photo-cell 41 is connected into the system, as shown. Initially, the switch 38 connects with the driving motor 47, but now in the reverse mode, so that the bundle is placed over the pallet 16, and either the switch 38 or the photo-cell 41 are activated, depending upon whether or not there is a first or right hand stack of bundles 10 on the pallet 16, as mentioned, and then the motor 49 is energized, but in the reverse direction, to create the release of the bundle on the pallet 16. At that time, the electric apparatus shown and described is ready to repeat the cycle for the pick up of the next bundle and deposit that bundle onto the pallet 16.

The clamp 27 can be arranged to be lowered to the pallet 16 for depositing the first bundles thereon in the lowermost row, such as by suitable actuation of the motor 48 in the lowering mode described in conjunction with the pick-up of the bundle 10. Alternatively, the pallet 16 can be supported on a table or the like 51 which can be a scissors type of table powered to be raised to the elevation desired for depositing the bundles on to the pallet 16 without requiring that the clamp assembly 27 be lowered in the deposit function. To achieve appropriate elevation in the event that a scissors table or a like conventional arrangement is utilized, a photo-cell 52 is shown suspended on an arm 53 from the rail 18, and the photo-cell 52 would detect the top edge or surface 54 which would be either the top of the pallet 16 or the top of the uppermost row of bundles 10, as shown in FIG. 1. That is, the photo-cell 52 would suitably control the scissors table through conventional powered means to elevate the table 51 to the desired height and then to lower the table each time that a complete row of bundles 10 is placed on the pallet 16. The conventional scissors legs 56 and a motor 57 is shown and suitably operates the raising and lowering of the table 51 in a conventional manner.

FIG. 3 shows a pallet or skid hopper 58 having a stack of pallets or skids 16, the lower one of which contacts a feeder conveyor 59. Cleats or pushers 61 are affixed to the conveyor 59 which is suitable mounted for movement in the direction of the arrow designated 62, and the pusher 61 engage the lowermost pallet 16 to move the pallet to the right, when the conveyor 59 is operated. The table 51 is shown with a pallet 16 thereon and with three layers of bundles 10 stacked thereon, in the middle of FIG. 3. The conveyor 59 would be further actuated to move the completed collection or stack of bundles to the right hand position and on a conveyor or rollers 63, as seen in FIG. 3. In this manner, the pallets or skids 16 can be automatically positioned on to their support or table 51, and, when each pallet 16 is loaded with the suitable number of bundles 10, then the conveyor 59 will again be operated to move to the right and deposit the loaded pallet off to the side, as shown.

The foregoing description details both the method and apparatus of this invention, and anyone skilled in the art will be able to understand the detailed description. Also, U.S. Pat. No. 3,820,446 shows one arrangement for a fluid assembly, such as the assembly 28 utilized herein. Further, U.S. Pat. No. 3,826,487, incorporated herein by reference to the extent required, shows the common utilization of a photo-electric cell in detecting the location and movement of sheets, such as in the graphic arts industry. In the present description, the photo-cell 41 and the electric switches are sensors.

With the aforementioned description of the method and apparatus, it will be apparent that the invention can also be utilized for taking individual bundles of sheets or signatures from a pick-up station and delivering them to remote locations, such as sheet feeders. That is, the method and apparatus of this invention can be utilized to accomplish the delivery of bundles of sheets to sheet feeder apparatus, and reference is made to U.S. Pat. Nos. 3,739,924 and 4,082,174, both of which show bundles delivered to sheet feeder apparatus. Therefore, the method and apparatus explained herein can be utilized in a reverse manner so that bundles can be picked up at a pick-up station and delivered to specific but remote drop or deposit locations. That is, in reference to FIG. 1, the bundles 10 on the pallet 16 can be individually picked up by means of the clamp and the overhead crane system 17, and the bundles can then be transported to the drop off station, such as the support designated 11 which could be a sheet feeder table or the like. My U.S. patent application "Crane System Sheet Feeder Method and Apparatus", Ser. No. 368,372, filed Apr. 14, 1982, also discloses the overhead crane system for moving bundles to sheet feeders, and it is incorporated herein by reference thereto.

What is claimed is:

1. A method of stacking bundles of sheets from a pickup station and onto a pallet and with an overhead crane system, comprising the steps of binding sheets into bound bundles of sheets in an elongated form of opposite ends in the direction of each bundle length and with two opposite sides extending in respective vertical planes between the opposite ends, locating a pallet on a floor, gripping the first one of a bundle of sheets at said pickup station and with a powered clamp in abutment with only said opposite ends on the length of the bundle of sheets, lifting the clamped bundle of sheets and said clamp with a crane and into an overhead position, moving the bundle of sheets and said clamp horizontally to a position directly above said pallet, lowering the bundle of sheets onto said pallet and with said opposite sides still vertical, moving the powered clamp back to said pickup station, gripping a second bundle of sheets at said pickup station and lifting and moving said second bundle of sheets to a position directly above said pallet, electrically sensing the location of one of said opposite sides of said first bundle of sheets on said pallet, electrically moving said second bundle of sheets and said powered clamp in response to said electric sensing and positioning one of said opposite sides of said second bundle of said sheets into contact with said one opposite side of said first bundle of sheets and further positioning said second bundle of sheets onto said pallet and in side-by-side contact with said first bundle of sheets.

2. The method of stacking bundles of sheets from a pickup station and onto a pallet and with an overhead crane system, as claimed in claim 1, including the step of lowering said pallet the height of the bundles after one layer of the bundles exists on said pallet in side-by-side position.

3. The method of stacking bundles of sheets from a pickup station and onto a pallet and with an overhead crane system, as claimed in claim 1 or 2, including the step of governing all movement of the powered clamp by electric elements.

4. The method of stacking bundles of sheets from a pickup station and onto a pallet and with an overhead crane system, as claimed in claim 3, including the step of photo-electrically sensing the positions of the bundles on said pallet for guidance of said powered clamp.

5. The method of stacking bundles of sheets from a pickup station and onto a pallet and with an overhead crane system, as claimed in claim 1 or 2, including the step of restraining the bundles and said powered clamp against all horizontal swinging motion, to thereby assure accurate clamping and placing of the bundles onto the pallet.

6. Apparatus for picking up bundles of sheets at a pickup station and stacking the bundles of sheets onto a pallet and with each of the bundles of sheets being bound in an elongated shape and having opposite ends and having open opposite sides in respective vertical planes, comprising a pallet at a pallet location, an electrically operated overhead crane, an electrically operated powered clamp suspended from said overhead crane, electrically powered means connected with said clamp for lowering and raising said clamp relative to said crane and for moving said clamp, said powered clamp including oppositely facing abutments for abutting the opposite ends of the bundle of sheets, a photo-electric sensor operatively connected with said powered means for energizing the latter to move said clamp and a first of the bundles between said pickup station and said pallet, said sensor being mounted on said clamp in a position to sense one of said opposite sides of said first of the bundle of sheets on said pallet and thereby energize said powered means to position a second of the bundle of sheets with its one of said opposite sides thereon in contact with said one side of the first of the bundle of sheets and in side-by-side relation on said pallet.

7. The apparatus for picking up a bundle of sheets at a pickup station and stacking the bundle of sheets onto a pallet, as claimed in claim 6, including powered mechanism operatively associated with said pallet for raising and lowering said pallet, and a photo-electric element fixedly disposed at a selected location adjacent said pallet and connected with said powered mechanism for energizing the latter in accordance with the number of said bundles on said pallet.

8. The apparatus for picking up a bundle of sheets at a pickup station and stacking the bundle of sheets onto a pallet, as claimed in claim 6 or 7, including stabilizing members connected between said clamp and said crane assembly for restraining horizontal swinging movement of said clamp.

9. The apparatus for picking up a bundle of sheets at a pickup station and stacking the bundle of sheets onto a pallet, as claimed in claim 6 or 7, including a pallet hopper and pallets located adjacent said pallet location, a powered mover operative at said pallet hopper for moving a pallet from said pallet hopper and to said pallet location.

10. The apparatus for moving bundles of sheets from a pickup station and to remote locations, as claimed in claim 6 or 7, wherein said clamp is U-shaped with said abutments and extends adjacent only the bundle of said opposite ends and is clear of the bundle said opposite sides.

* * * * *

UNITED STATES PATENT AND TRADEMARK OFFICE
CERTIFICATE OF CORRECTION

PATENT NO. : 4,419,035
DATED : 6 December 1983
INVENTOR(S) : Walter J. Stobb

It is certified that error appears in the above–identified patent and that said Letters Patent are hereby corrected as shown below:

Column 6, Line 62, cancel "of"

Signed and Sealed this

Sixteenth Day of October 1984

[SEAL]

Attest:

GERALD J. MOSSINGHOFF

Attesting Officer    Commissioner of Patents and Trademarks